United States Patent
Madison et al.

(10) Patent No.: US 10,838,427 B2
(45) Date of Patent: Nov. 17, 2020

(54) VISION-AIDED INERTIAL NAVIGATION WITH LOOP CLOSURE

(71) Applicant: The Charles Stark Draper Laboratory, Inc., Cambridge, MA (US)

(72) Inventors: Richard W. Madison, Bedford, MA (US); Melanie K. Stich, Cambridge, MA (US)

(73) Assignee: The Charles Stark Draper Laboratory, Inc., Cambridge, MA (US)

(*) Notice: Subject to any disclaimer, the term of this patent is extended or adjusted under 35 U.S.C. 154(b) by 440 days.

(21) Appl. No.: 15/794,339

(22) Filed: Oct. 26, 2017

(65) Prior Publication Data
US 2018/0113469 A1     Apr. 26, 2018

Related U.S. Application Data

(60) Provisional application No. 62/413,251, filed on Oct. 26, 2016.

(51) Int. Cl.
| | |
|---|---|
| *G05D 1/02* | (2020.01) |
| *G01C 21/16* | (2006.01) |
| *G01C 22/00* | (2006.01) |

(52) U.S. Cl.
CPC ......... *G05D 1/0253* (2013.01); *G01C 21/165* (2013.01); *G01C 22/00* (2013.01); *G05D 1/027* (2013.01); *G05D 1/0272* (2013.01)

(58) Field of Classification Search
CPC .... G05D 1/0253; G05D 1/027; G05D 1/0272; G01C 22/00; G01C 21/165
See application file for complete search history.

(56) References Cited

U.S. PATENT DOCUMENTS

| | | |
|---|---|---|
| 2008/0167814 A1 | 7/2008 | Samarasekera et al. |
| 2010/0014712 A1 | 1/2010 | Sampedro Diaz et al. |
| 2014/0341465 A1* | 11/2014 | Li ..................... G06K 9/00664 382/160 |
| 2015/0369609 A1* | 12/2015 | Roumeliotis ........ G01C 21/165 701/532 |
| 2016/0161260 A1* | 6/2016 | Mourikis ............. G01C 21/165 |
| 2016/0305784 A1 | 10/2016 | Roumeliotis et al. |

(Continued)

OTHER PUBLICATIONS

M. Kaess, S. Williams, V. Indelman, R. Roberts, J. J. Leonard and F. Dellaert, "Concurrent filtering and smoothing," 2012 15th International Conference on Information Fusion, Singapore, 2012, pp. 1300-1307. (Year: 2012).*

(Continued)

*Primary Examiner* — Jeffrey C Boomer
(74) *Attorney, Agent, or Firm* — Sunstein LLP

(57) ABSTRACT

A vision-aided inertial navigation system determines navigation solutions for a traveling vehicle. A navigation solution module analyzes image sensor poses and estimated inertial navigation solutions to produce a time sequence of system navigation solution outputs that represent changing locations of the traveling vehicle. A loop closure detector performs a two-threshold image classification to classify an incoming navigation image as novel, loop-closing, or neither, and the navigation solution module resets the navigation solution output to represent a previous location when the loop closure detector classifies an incoming navigation image as loop-closing.

12 Claims, 3 Drawing Sheets
(1 of 3 Drawing Sheet(s) Filed in Color)

(56) References Cited

U.S. PATENT DOCUMENTS

2016/0327395 A1* 11/2016 Roumeliotis ........ G01C 21/165
2019/0154449 A1* 5/2019 Roumeliotis ............. G01S 5/16

OTHER PUBLICATIONS

Y. Hou, H. Zhang and S. Zhou, "Convolutional neural network-based image representation for visual loop closure detection," 2015 IEEE International Conference on Information and Automation, Lijiang, 2015, pp. 2238-2245. (Year: 2015).*

John Kua, Nicholas Corso, Avideh Zakhor, "Automatic loop closure detection using multiple cameras for 3D indoor localization," Proc. SPIE 8296, Computational Imaging X, 82960V (Feb. 10, 2012) (Year: 2012).*

Grisetti, et al., "A Tutorial on Graph-Based SLAM," IEEE Intelligent Transportation Systems Magazine, vol. 2, Issue 4, pp. 31-43, Jan. 31, 2011.

International Searching Authority, International Search Report—International Application No. PCT/US17/58410, dated Jan. 5, 2018 together with the Written Opinion of the International Searching Authority, 15 pages.

International Searching Authority, International Search Report—International Application No. PCT/US17/58447, dated Jan. 5, 2018 together with the Written Opinion of the International Searching Authority, 14 pages.

Mourikis et al., "A multi-state constraint Kalman filter for vision-aided inertial navigation." Proceedings of the IEEE International Conference on Robotics and Automation, IEEE, 2007.

International Searching Authority, International Search Report—International Application No. PCT/US17/58410, dated Jan. 5, 2018 together with the Written Opinion of the International Searching Authority, 14 pages.

International Searching Authority, International Search Report—International Application No. PCT/US17/58447, dated Jan. 5, 2018 together with the Written Opinion of the International Searching Authority, 15 pages.

Tipaldi, et al., "Approximate Covariance Estimation in Graphical Approaches to SLAM," 2007 IEEE/RSJ International Conference on Intelligent Robots and Systems, 6 pages, Oct. 29, 2007.

* cited by examiner

US 10,838,427 B2

VISION-AIDED INERTIAL NAVIGATION WITH LOOP CLOSURE

This application claims priority to U.S. Provisional Patent Application 62/413,251, filed Oct. 26, 2016, which is incorporated herein by reference in its entirety.

STATEMENT REGARDING FEDERALLY SPONSORED RESEARCH OR DEVELOPMENT

This invention was made with Government support under Contract Number W56KGU-14-C-00035 awarded by the U.S. Army (RDECOM, ACC-APG CERDEC). The U.S. Government has certain rights in the invention.

TECHNICAL FIELD

The present invention relates to vision-aided inertial navigation.

BACKGROUND ART

Odometry is the use of data from motion sensors to estimate changes in position over time. For example, a wheeled autonomous robot may use rotary encoders coupled to its wheels to measure rotations of the wheels and estimate distance and direction traveled along a factory floor from an initial location. Thus, odometry estimates position and/or orientation relative to a starting location. The output of an odometry system is called a navigation solution.

Visual odometry uses one or more cameras to capture a series of images (frames) and estimate current position and/or orientation from an earlier, in some cases initial, position and/or orientation by tracking apparent movement of features within the series of images. Image features that may be tracked include points, lines or other shapes within the image that are distinguishable from their respective local backgrounds by some visual attribute, such as brightness or color, as long as the features can be assumed to remain fixed, relative to a navigational reference frame, or motion of the features within the reference frame can be modeled, and as long as the visual attribute of the features can be assumed to remain constant over the time the images are captured, or temporal changes in the visual attribute can be modeled.

A camera that travels along with a vehicle can be used to estimate ego motion of the vehicle. In this case, the features are assumed to be fixed in the reference frame or their motions are modeled. Similarly, a camera fixed in a reference frame can be used to estimate motion of a vehicle moving within the reference frame. In this case, the moving vehicle provides at least one of the image features that are tracked.

Visual odometry is usable regardless of the type of locomotion used. For example, visual odometry is usable by aircraft, where no wheels or other sensors can directly record distance traveled. However, all forms of odometry suffer from accumulated error. For example, wheel slip in a robot introduces error, because the robot does not travel as far as rotation of the wheel indicates. Similarly, location accuracy of a feature within an image is limited by resolution of the camera that captured the image. Furthermore, because odometry estimates a current position from an estimated distance traveled from a previously estimated position, any error in any of the position or distance estimates accumulates.

Some odometry systems adjust their navigation solutions whenever they return to a previously visited location. Such a system occasionally or periodically stores copies of images, along with navigation solutions estimated from the images. Incoming (new) images are compared to the stored images. If an incoming image matches a stored image, the system assumes it has returned to a previous location, essentially completing a loop ("loop closure"), and the system sets the current navigation solution to the stored navigation solution, thereby cancelling any error that has accumulated since capturing the earlier image. However, loop closure poses problems, at least because a transform between the camera pose of the loop closure image and the camera pose of the matching image is not known in all six degrees of freedom. Further background information on visual odometry is available in Giorgio Grisetti, et al., "A Tutorial on Graph-Based SLAM," IEEE Intelligent Transportation Systems Magazine, Vol. 2, Issue 4, pp. 31-43, Jan. 31, 2011, the entire contents of which are hereby incorporated by reference herein.

Vision-aided inertial navigation systems combine the use of visual odometry with inertial measurements to obtain an estimated navigational solution. For example, one approach uses what is known as multi-state constraint Kalman filter. See Mourikis, Anastasios I., and Stergios I. Roumeliotis. "A multi-state constraint Kalman filter for vision-aided inertial navigation." Proceedings of the *IEEE International Conference on Robotics and Automation*, IEEE, 2007, which is incorporated herein by reference in its entirety.

SUMMARY

Embodiments of the present invention are directed to a computer-implemented vision-aided inertial navigation system for determining navigation solutions for a traveling vehicle. An image sensor is configured for producing a time sequence of navigation images. An inertial measurement unit (IMU) sensor is configured to generate a time sequence of inertial navigation information. Data storage memory is configured for storing navigation software, the navigation images, the inertial navigation information, and other system information. A navigation processor includes at least one hardware processor coupled to the data storage memory and is configured to execute the navigation software to implement the various system components. A multi-state constraint Kalman filter (MSCKF) is configured to analyze the navigation images to produce a time sequence of estimated image sensor poses characterizing estimated position and orientation of the image sensor for each navigation image. A strapdown integrator is configured to analyze the inertial navigation information to produce a time sequence of estimated inertial navigation solutions representing changing locations of the traveling vehicle. A navigation solution module is configured to analyze the image sensor poses and the estimated inertial navigation solutions to produce a time sequence of system navigation solution outputs representing changing locations of the traveling vehicle. A loop closure detector is configured to perform a two-threshold image classification to classify an incoming navigation image as novel, loop-closing, or neither. And the navigation solution module is configured to reset the navigation solution output to represent a previous location when the loop closure detector classifies an incoming navigation image as loop-closing.

In further specific embodiments, the loop closure detector may be configured to use a convolutional neural network to classify every nth navigation image. The loop closure detector may use a feed-forward image classification. The loop closure detector may be configured to classify an incoming navigation image based on a five degree-of-freedom transform. The navigation solution module may be configured as a pose graph solver to produce the system navigation solution outputs in pose graph form. The navigation solution module may be configured to calculate a six degree-of-freedom covariance for use with the image classification from the loop closure detector.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Visual odometry as in a vision aided inertial navigation system involves analysis of optical flow, for example, using a Lucas-Kanade algorithm. Optical flow is the pattern of apparent motion of objects, surfaces, and edges in a visual scene caused by the relative motion between an observer (such as a camera) and the scene. Embodiments of the present invention modify the Lucas-Kanade method as implemented in a multi-state constraint Kalman filter (MSCKF) arrangement.

Vision odometry systems slowly accumulate navigational error. Embodiments of the present invention are directed to reducing or eliminating accumulated error in a visual-aided inertial navigation system for a traveling vehicle by resetting the system navigation solution whenever the system determines that the vehicle has returned to a previous location. This determination involves a process referred to as loop closure. The system stores navigation images and estimated navigation solutions that are associated with the navigation images. New incoming navigation images are compared to the stored images. If an incoming image matches a stored image, the system assumes it has returned to a previous location, essentially completing a loop, and the system sets the current navigation solution to the previously stored navigation solution, thereby cancelling any error that has accumulated since capturing the earlier image.

Embodiments such as those described herein incorporate loop closure into an MSCKF system, interleaving the loop closing steps into the steps of the existing MSCKF algorithm. The loop closing steps are sequential (not themselves a loop) and so avoid feeding back information into the MSCKF filter, which could result in reusing the same information multiple times, whereas the equations by which a filter estimates its own uncertainty depend on using any piece of information only once.

Figure 1:
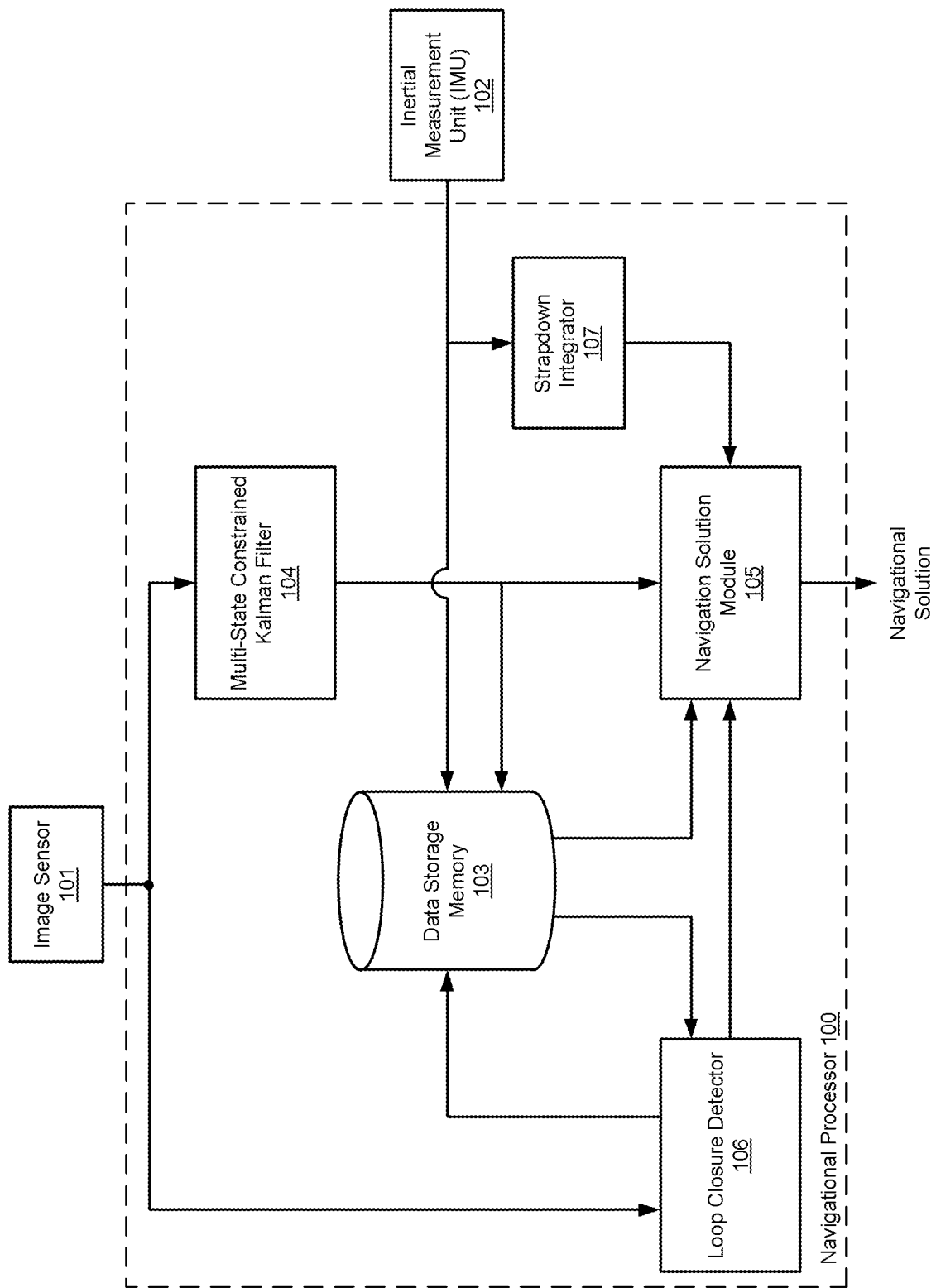
FIG. 1 shows various functional blocks in a vision-aided inertial navigation system according to an embodiment of the present invention.

FIG. 1 shows various functional blocks in a vision-aided inertial navigation system according to an embodiment of the present invention. An image sensor 101 such as a monocular camera is configured for producing a time sequence of navigation images. Other non-limiting specific examples of image sensors 101 include high-resolution forward-looking infrared (FLIR) image sensors, dual-mode lasers, charge-coupled device (CCD-TV) visible spectrum television cameras, laser spot trackers and laser markers. An image sensor 101 such as a video camera in a typical application may be dynamically aimable relative to the traveling vehicle to scan the sky or ground for a destination (or target) and then maintain the destination within the field of view while the vehicle maneuvers.

An image sensor 101 such as a camera may have an optical axis along which the navigation images represent scenes within the field of view. A direction in which the optical axis extends from the image sensor 101 depends on the attitude of the image sensor, which may, for example, be measured as rotations of the image sensor 101 about three mutually orthogonal axes (x, y and z). The terms "sensor pose" or "camera pose" mean the position and attitude of the image sensor 101 in a global frame. Thus, as the vehicle travels in space, the image sensor pose changes, and consequently the imagery captured by the image sensor 101 changes, even if the attitude of the image sensor remains constant Data storage memory 103 is configured for storing navigation software, the navigation images, the inertial navigation information, and other system information. A navigation processor 100 includes at least one hardware processor coupled to the data storage memory 103 and is configured to execute the navigation software to implement the various system components. This includes a multi-state constraint Kalman filter (MSCKF) 104 that is configured to analyze the navigation images to produce a time sequence of estimated image sensor poses characterizing estimated position and orientation of the image sensor for each navigation image. The MSCKF 104 is configured to simultaneously estimate the image sensor poses for a sliding window of at least three recent navigation images. Each new image enters the window, remains there for a time, and eventually is pushed out to make room for newer images. To support loop closure, the MSCKF 104 reports a best-and-final image sensor pose estimate for each image as it leaves the window.

An inertial measurement unit (IMU) 102 (e.g. one or more accelerometers, gyroscopes, etc.) is a sensor configured to generate a time sequence of inertial navigation information. A strapdown integrator 107 is configured to analyze the inertial navigation information from the inertial sensor 102 to produce a time sequence of estimated inertial navigation solutions that represent changing locations of the traveling vehicle. More specifically, the IMU 102 measures and reports the specific force, angular rate and, in some cases, a magnetic field surrounding the traveling vehicle. The IMU 102 detects the present acceleration of the vehicle based on an accelerometer signal, and changes in rotational attributes such as pitch, roll and yaw based on one or more gyroscope signals. The estimated inertial navigation solutions from the strapdown integrator 107 represent regular estimates of the vehicle's position and attitude relative to a previous or initial position and attitude, a process known as dead reckoning.

Figure 2:
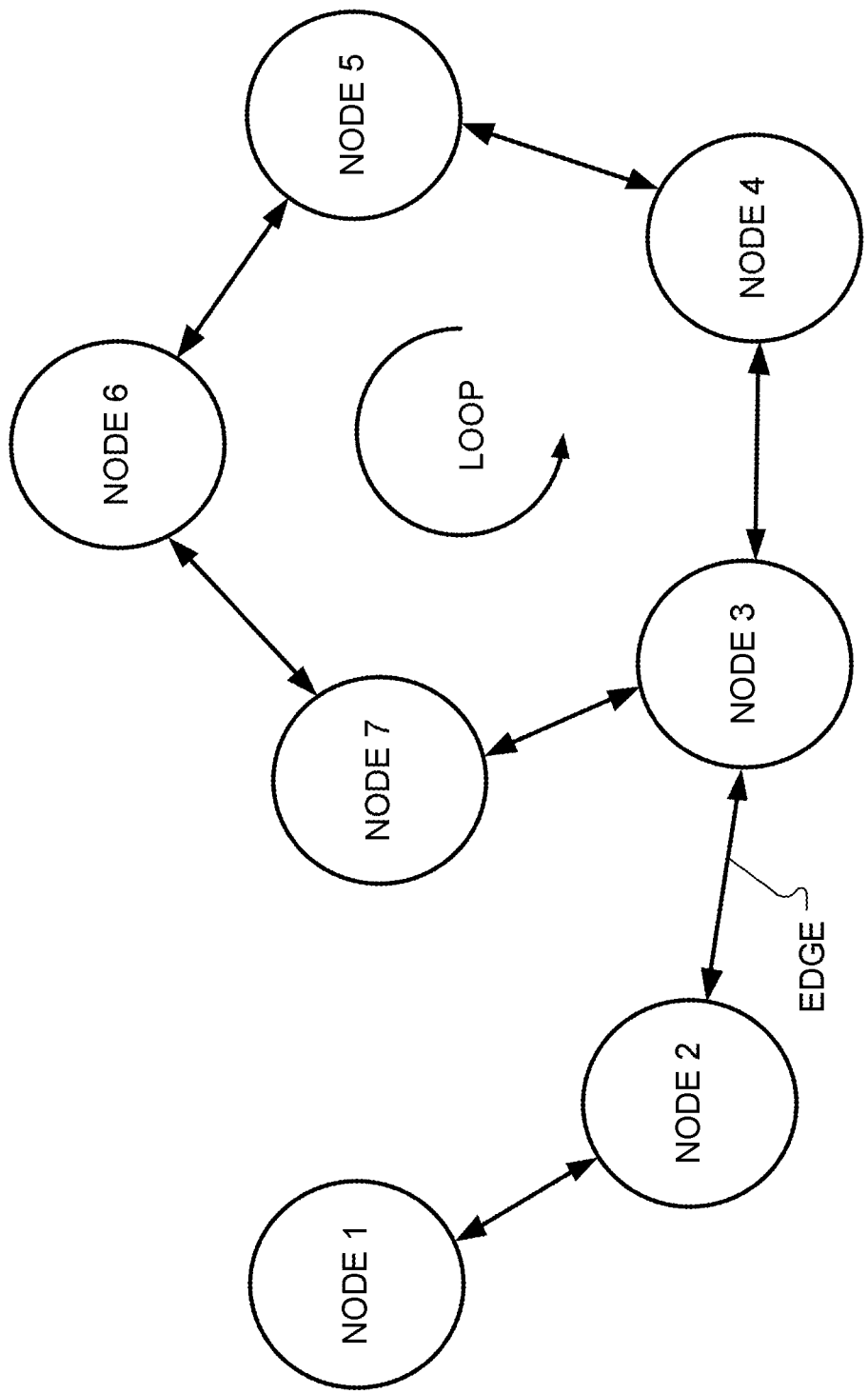
FIG. 2 shows an example of a pose graph representation of a time sequence of navigational images.

A navigation solution module 105 is configured to analyze the image sensor poses and the estimated inertial navigation solutions to produce a time sequence of system navigation solution outputs representing changing locations of the traveling vehicle. More specifically, the navigation solution module 105 may be configured as a pose graph solver to produce the system navigation solution outputs in pose graph form as shown in FIG. 2. Each node represents an image sensor pose (position and orientation) that captured the navigation image. Pairs of nodes are connected by edges that represent spatial constraints between the connected pair of nodes; for example, displacement and rotation of the image sensor 101 between the nodes. This spatial constraint is referred to as a six degree of freedom (6DoF) transform.

A loop closure detector 106 is configured to perform a two-threshold image classification to classify an incoming navigation image as novel, loop-closing, or neither. The navigation solution module 105 is configured to reset the navigation solution output to represent a previous location when the loop closure detector 106 classifies an incoming navigation image as loop-closing. This image classification reduces false positive and false negative matches to stored navigation images without requiring an especially strong comparison metric.

The loop closure detector 106 compares incoming (new) navigation images to the stored scene images in the scene database in the data storage memory 103. The loop closure detector 106 specifically may be implemented using MATLAB multi-paradigm numerical computing environment and either TensorFlow™, an open source software library for numerical computation using data flow graphs, or the Caffe neural network. The loop closure detector 106 then processes every Nth incoming navigation image using a TensorFlow convolutional neural network to distill the images into feature vectors. It compares vectors between incoming images and an (initially empty) scene database of previously stored images and uses a dual-threshold to categorize each vector/image as a new scene (which is added to the database), a re-recognition of an old scene (i.e., a loop closure) or an uncertain match (which is ignored).

The pose graph solver implemented in the navigation solution module 105 may include the GTSAM toolbox (Georgia Tech Smoothing and Mapping), a BSD-licensed C++ library developed at the Georgia Institute of Technology. As the MSCKF 104 finishes with each navigation image and reports its best-and-final image sensor pose, the navigation solution module 105 creates a pose graph node containing the best-and-final pose and connects the new and previous nodes by a link containing the transform between the poses at the two nodes. When the loop closure detector 106 reports a loop closure (and a pose transform) between two nodes, the navigation solution module 105 links the associated pose graph nodes with that transform. This creates a loop in the graph with a chain of transform-links that should multiply to form an identity transform. However, the chain does not so multiply because of error in the transforms. The navigation solution module 105 redistributes the error, in theory improving the link transforms between nodes. The navigation solution module 105 concatenates these improved transforms to calculate improved poses associated with each node. By comparing the improved pose to the MSCKF-reported pose at the most recent node, the navigation solution module 105 can determine the accumulated navigation error.

When the loop closure detector 106 finds a match between an incoming navigation image and a stored scene image, it generates a transform between the image sensor poses of the two images. For example, the loop closure detector 106 may specifically use a convolutional neural network to classify every nth navigation image using a feed-forward image classification and a five degree-of-freedom (5DoF) transform calculated between the loop closure images and their respective matching stored images. Although two images may match as a result of the vehicle having returned to a previous location (closed a loop), the image sensor pose at the beginning of the loop and the image sensor pose at the end of the loop may not be identical. The end-of-the-loop (loop closure) pose may be slightly or somewhat different from the pose at the beginning of the loop. Nevertheless, the navigation images captured by the image sensor 101 at these two poses may be sufficiently similar or contain a sufficient number of matching features to conclude the vehicle has closed a loop.

The navigation solution module 105 may be configured to calculate a six degree-of-freedom covariance for use with the image classification from the loop closure detector 106. More specifically, the MSCKF 104 records a nominal six degree-of-freedom (6DoF) position and orientation (attitude) of the image sensor 101 for each navigation image. The navigation solution module 105 then combines the 5DoF transforms from the loop closure detector 106 and the 6DoF transforms from the MSCKF 104 to distribute the estimate error across the 6DoF estimates, i.e. the system navigation solutions associated with the navigation images. Absence of feedback from the MSCKF 104 to the MSCKF 104 is advantageous because such feedback could make the MSCKF 104 inconsistent.

As just mentioned, the navigation solution module 105 requires notional 6DoF transforms between navigation images, but the loop closure detector 106 is limited to generating 5DoF transforms. This can be handled by calculating a 6DoF covariance that compensates for the missing degree of freedom from the loops closure detector 106. A derivation of the covariance equation is provided below. The 6DoF covariance describes the noise in the loop closing transform. Therefore, a 6DoF noise model is needed for the 5DoF loop closing transform. Since the covariance is defined such that the sixth degree of freedom is irrelevant, any value can be chosen for the sixth degree of freedom, and the system essentially constructs a very large covariance along the last (sixth) dimension.

When the navigation solution module 105 faces a new loop closure, it calculates the 6DoF transform (and its covariance) between the image sensor poses associated with the images that were matched by the loop closure detector 106. This is done because the loop closure detector 106 will match two images of the same scenes even if the image sensor poses are not exactly the same, relative to the scene. The loop closure detector 106 uses an eight-point pose algorithm to determine the 5DoF pose transform between two images, up to an unknown scale. The 6th degree of freedom is not observable from two monocular images, so to compensate, the system assumes a fixed distance of 1 m and then institutes a very large covariance along the translation axis between the two image sensor positions. Derivation of the covariance equation is discussed below.

Figure 3:
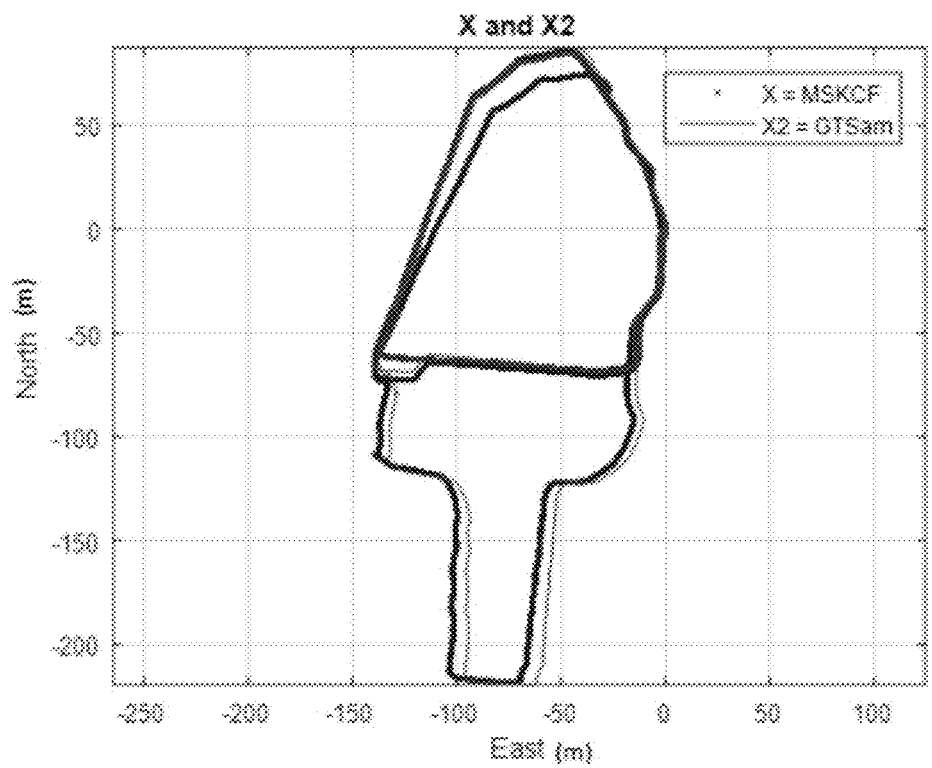
FIG. 3 shows a graph of system navigational solution outputs for one set of experiments according to an embodiment of the present invention for the set of experiments performed in FIG. 4

Tests of an embodiment of a vision-aided inertial navigation system with loop closure were conducted on a dataset consisting of three laps around a garage and a few adjacent buildings. FIG. 3 schematically illustrates two loops of a vehicle traveling in loops around a garage, and then a third loop encompassing the garage (top half of figure) and a group of other buildings (bottom half of figure), as estimated by a conventional MSCKF system (in blue) and by an embodiment of the invention using MSCKF with loop closure (in red). The separate blue curve in the top half of FIG. 3 is the end of the third loop, which does not coincide with the other loops because it includes navigation error. Around the location of North −50, East −130, the red line is jagged where loop closure made two corrections to bring the navigation solution back into alignment with the first two loops. As shown in FIG. 3, loop closure improved the navigation solution noticeably. The data did not include a truth signal, so the improvements could not be quantified.

Figure 4:
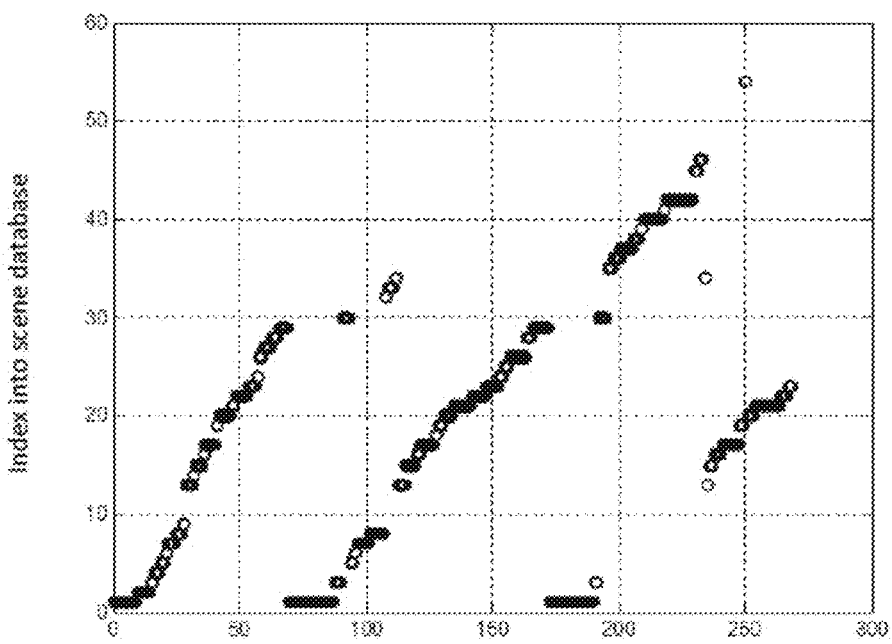
FIG. 4 shows a graph of chronologically ordered scene database matches for the set of experiments performed in FIG. 3.

FIG. 4 is a graph showing successful loop closure detections on example three-loop trajectory as shown in FIG. 3. The loop closure detector 106 compares every tenth incoming navigation image against an (initially empty) scene database in the data storage memory 103. If the loop closure detector 106 classifies a given navigation image as novel (it does not match an existing database entry), then it is added to the scene database as a new scene. But if the loop closure detector 106 classifies a given navigation image as loop-closing, that represents a match to a previous location of the traveling vehicle. Each circle in the FIG. 4 graph represents a loop-closing match. The diagonal line from the bottom left of the graph represents the first navigational loop traveled by the vehicle, rising with each newly detected scene or maintaining its height while the same scene remains visible in the navigational image. Vertical gaps occur in this graph either when the vehicle passes quickly through scenes and so does not see them twice, or when the loop closure detector 106 cannot confidently decide whether a given scene occurs again. On the second loop in FIG. 4, the loop closure detector 106 matches 70-170 of incoming navigation images including re-detecting scenes from the first loop, and the navigation solution module 105 builds a second diagonal line representing a second loop and adding about five new scenes to the scene database during this loop (vertical indices 30-34), the first of which probably represents looking in a new direction, and the last three new scenes reflecting new scenes observed while briefly diverting from the original loop path. In the third loop (matches 170-268), the system re-observes the scenes from the beginning of the loops (matches 170-190), strikes out into new scenery for the larger loop (matches 190-230), and then re-detects the return to the original loop (matches 230-268), matching scenes from the first two loops and adding one new scene, #250. Disagreement between the blue and red curves in the bottom half of FIG. 4 probably indicates error correction by loop closure, because heading south along the right side of the graph, the three loops in truth coincide until they split around (North −70, East −10), and the red curves reflect this truth, while the blue curves start to separate earlier.

Testing indicates that, in some cases, primary impediments to beneficial loop closure may be: (1) adding very few scenes to the database and detecting loop closures from those few scenes, perhaps due to unchanging scenery and (2) an incorrect orientation estimate along the loop closure. Thresholds may be tuned to cause the loop closure detector to add more scenes to the database or to be less strict in matching to previously observed scenes. A different convolutional neural network, using a different feature vector, may be more suited for non-varying scenery. Incorrect orientation estimated along the loop closure might also be corrected with more judicious thresholding. The pose estimator operates on tie-point matches between old and new images. It uses a feature detector to generate tie-point matches and the RANSAC algorithm to weed out false matches. Both the feature detector and RANSAC have thresholds, and making any of those thresholds stricter might prevent the pose estimator from incorporating false matches, which in turn would improve its pose estimation.

Some embodiments of the present invention include additional or different sensors, in addition to the camera. These sensors may be used to augment the MSCKF estimates. Optionally or alternatively, these sensors may be used to compensate for the lack of a scale for the sixth degree of freedom. For example, some embodiments include a velocimeter, in order to add a sensor modality to CERDEC's GPS-denied navigation sensor repertoire and/or a pedometer, to enable evaluating the navigation accuracy improvement from tightly coupling pedometry, vision and strapdown navigation rather than combining the outputs of independent visual-inertial and pedometry filters.

Derivation of Covariance Equation

The true pose transform between two images can be expressed as $[w_x, w_y, w_z, t_x, t_y, t_z]$. But actually for the eight point pose algorithm the actual measurements are $[w_x, w_y, w_z, st_x, st_y, st_y]$, for some unknown scale s. Treating s as a random variable that runs from $1/k$ to $k$ with $$P(s) = \frac{1}{s 2\ln(k)},$$

then the integral of P(s) is 1, so P(s) is a probability distribution and there is equal probability on either side of s=1. This may seem an arbitrary choice of distribution, but intuitively it accounts for the fact that scale is completely unknown, it is balanced about 1, and it allows the use of a large k without going to infinity and making the equations computationally unusable. The expected mean $$E[s] = \int s P(s) = \frac{k - 1/k}{2\ln(k)}, \text{ so } E[s]$$

(unfortunately) is not 1.

If the true covariance is diag $([dw_x, dw_y, dw_z, dt_x, dt_y, dt_z]^2)$, then to calculate the new (observation) covariance in terms of the old (truth) covariance:

$$\begin{aligned} \text{observation} &= [w_x + dw_x, w_y + dw_y, w_z + dw_z, dt_x, dt_y, dt_z, \\ &\quad (t_x + dt_x)s, (t_y + dt_y)s, (t_z + dt_z)s] \\ &= [w + dw, (t + dt)s]. \end{aligned}$$

The new covariance=[cw cc; cc' ct], where cw= E[dw*dw']=diag(dw²) (same as the previously used covariance).

cc=E[dw*((t+dt)*s−t)']=(s−1)*t*E[dw]+s*E[dw*dt']=0 (again, same as the previously used covariance).

$$\begin{aligned} ct &= E[((t + dt)*s - t)*((t + dt)*s - dt)'] \\ &= E[((s-1)*t)*(s-1)*t)' + (s-1)*t*s*dt' + (s-1)* \\ &\quad dt*s*t' + (s*dt)*(s*dt)'] \\ &= E[((s-1)*t)*(s-1)*t)' + (s*dt)*(s*dt)'] \\ &\quad \text{(because } s, t, dt \text{ are independent)} \\ &= E[(s-1)^2]*t*t' + E[s^2]*E[dt*dt'] \\ &= E[(s-1)^2]*t*t' + E[s^2]*oldcov \end{aligned}$$

$$\begin{aligned} E[s^2] &= \int s^2 P(s), s = 1/k : k \\ &= s/(2*\ln(k)) \\ &= (k^2 - 1/k^2)/4/\ln(k) \end{aligned}$$

$$\begin{aligned} E[(s-1)^2] &= \int (s-1)^2 P(s), s = 1/k : k \\ &= ((k^2 - 1/k^2) - 4(k - 1/k))/(4*\ln(k)) + 1 \end{aligned}$$

A value can then be provided for k and then solve for the covariance. Eight point pose gives 1 m translation, and for a given specific application, it may be unlikely that there would translations above 100 m or below 1 cm, suggesting a choice of k=100.

Cov=[?, ?; ? 4901*t*t'+5000*oldcov].

Ct=522*t*t'+543*oldcov

In summary, newcov=[diag(dw$^2$), 0; 0, 522*t*t'+543*oldcov], where t is the translation vector.

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks.

While specific parameter values may be recited in relation to disclosed embodiments, within the scope of the invention, the values of all of parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Embodiments disclosed herein may be suitably practiced, absent any element that is not specifically disclosed herein. Accordingly, the invention should not be viewed as being limited to the disclosed embodiments.

What is claimed is:

1. A computer-implemented vision-aided inertial navigation system for determining navigation solutions for a traveling vehicle, the system comprising:

an image sensor configured for producing a time sequence of navigation images;

an inertial measurement unit (IMU) sensor configured to generate a time sequence of inertial navigation information;

data storage memory configured for storing navigation software, the navigation images, the inertial navigation information, and other system information;

a navigation processor including at least one hardware processor coupled to the data storage memory and configured to execute the navigation software, wherein the navigation software includes processor readable instructions to implement:

a multi-state constraint Kalman filter (MSCKF) configured to analyze the navigation images to produce a time sequence of estimated image sensor poses characterizing estimated position and orientation of the image sensor for each navigation image;

a strapdown integrator configured to analyze the inertial navigation information to produce a time sequence of estimated inertial navigation solutions representing changing locations of the traveling vehicle;

a navigation solution module configured to (i) analyze the image sensor poses and the estimated inertial navigation solutions to produce a time sequence of system navigation solution outputs representing changing locations of the traveling vehicle and (ii) calculate a covariance used to estimate errors in the navigation solution outputs and to redistribute the errors among the system navigation solution outputs; and a loop closure detector configured to perform a two-threshold image classification to classify an incoming navigation image as:
   novel,
   loop-closing, or
   neither;

wherein the navigation solution module is configured to reset the navigation solution output to represent a previous location when the loop closure detector classifies an incoming navigation image as loop-closing, and wherein the loop closure detector is configured to perform the two-threshold image classification without providing feedback from the navigation solution module to the MSCKF.

2. The system according to claim 1, wherein the loop closure detector is configured to use a convolutional neural network to classify every nth navigation image.

3. The system according to claim 1, wherein the loop closure detector uses a feed-forward image classification.

4. The system according to claim 1, wherein the loop closure detector is configured to classify an incoming navigation image based on a five degree-of-freedom transform.

5. The system according to claim 1, wherein the navigation solution module is configured as a pose graph solver to produce the system navigation solution outputs in pose graph form.

6. The system according to claim 5, wherein the covariance is a six degree-of-freedom covariance.

7. A computer-implemented method employing at least one hardware implemented computer processor for performing vision-aided navigation to determine navigation solutions for a traveling vehicle, the method comprising:

producing a time sequence of navigation images from an image sensor;

generating a time sequence of inertial navigation information from an inertial measurement unit (IMU) sensor;
operating the at least one hardware processor to execute program instructions to:
   analyze the navigation images with a multi-state constraint Kalman filter (MSCKF) to produce a time sequence of estimated image sensor poses characterizing estimated position and orientation of the image sensor for each navigation image;
   analyze the inertial navigation information to produce a time sequence of estimated inertial navigation solutions representing changing locations of the traveling vehicle;
   analyze the image sensor poses and the estimated inertial navigation solutions to produce a time sequence of system navigation solution outputs representing changing locations of the traveling vehicle;
   calculate a covariance used to estimate errors in the navigation solution outputs and redistribute the errors among the system navigation solution outputs; and
   perform a two-threshold image classification to classify an incoming navigation image as:
      a. novel,
      b. loop-closing, or
      c. neither;
   wherein the navigation solution output is reset to represent a previous location
      when an incoming navigation image is classified as loop-closing, and wherein the two-threshold image classification performs without providing feedback from the MSCKF.

8. The method according to claim 7, wherein a convolutional neural network is used to classify every nth navigation image.

9. The method according to claim 7, wherein the image classification uses a feed-forward approach.

10. The method according to claim 7, wherein classifying an incoming navigation image is based on a five degree-of-freedom transform.

11. The method according to claim 7, wherein the navigation solution output is provided in pose graph form.

12. The method according to claim 11, wherein the covariance is a six degree-of-freedom covariance.

* * * * *